United States Patent
Stavenow et al.

(10) Patent No.: US 11,465,197 B2
(45) Date of Patent: Oct. 11, 2022

(54) DEVICE FOR COUPLING A COOLANT SUPPLY TO A ROLL

(71) Applicant: SMS GROUP GMBH, Duesseldorf (DE)

(72) Inventors: Axel Stavenow, Duesseldorf (DE); Alexander Raile, Mettmann (DE); Michael Steuten, Moers (DE); Tobias Wissen, Duisburg (DE)

(73) Assignee: SMS GROUP GMBH, Duesseldorf (DE)

( * ) Notice: Subject to any disclaimer, the term of this patent is extended or adjusted under 35 U.S.C. 154(b) by 145 days.

(21) Appl. No.: 16/757,382

(22) PCT Filed: Oct. 15, 2018

(86) PCT No.: PCT/EP2018/078120
§ 371 (c)(1),
(2) Date: Apr. 18, 2020

(87) PCT Pub. No.: WO2019/076836
PCT Pub. Date: Apr. 25, 2019

(65) Prior Publication Data
US 2021/0362221 A1 Nov. 25, 2021

(30) Foreign Application Priority Data

Oct. 18, 2017 (DE) .......................... 102017218629.1
Apr. 30, 2018 (DE) .......................... 102018206688.4

(51) Int. Cl.
*B22D 11/128* (2006.01)
*B22D 11/124* (2006.01)

(52) U.S. Cl.
CPC ........ *B22D 11/1287* (2013.01); *B22D 11/124* (2013.01)

(58) Field of Classification Search
CPC ..... B22D 11/12; B22D 11/124; B22D 11/128; B22D 11/1287; F16L 27/0828; F16L 27/093
(Continued)

(56) References Cited

U.S. PATENT DOCUMENTS

2005/0028962 A1 2/2005 Mousel et al.
2007/0228726 A1 10/2007 Springmann

FOREIGN PATENT DOCUMENTS

CA 2094828 A1 3/1993
CN 2675297 Y 2/2005
(Continued)

OTHER PUBLICATIONS

International Search Report and Written Opinion of the International Searching Authority, dated Oct. 28, 2018 for corresponding PCT patent application No. PCT/EP2018/078120.

*Primary Examiner* — Kevin P Kerns
(74) *Attorney, Agent, or Firm* — Amster, Rothstein & Ebenstein LLP

(57) ABSTRACT

A device is disclosed for coupling a coolant supply and/or coolant drainage to a roll, especially in a continuous casting installation, wherein the roll includes a journal, which is mounted rotatably in a bearing block, and a lateral recess, extending in the axial direction, and at least one roll cooling channel, through which a coolant can pass. The device includes at least one coolant channel, which can be brought into fluidic connection with the roll cooling channel on the journal side; and a sealing unit for sealing the fluidic connection between the coolant channel and the roll cooling channel, including an inner module and an outer module. The inner module includes a hollow cylindrical element, which can be inserted into the lateral recess of the journal, (Continued)

and which, when viewed in the axial direction, has no flange on the outer side of the journal.

20 Claims, 2 Drawing Sheets

(58) Field of Classification Search
USPC .......................................... 164/442, 443, 448
See application file for complete search history.

(56) References Cited

FOREIGN PATENT DOCUMENTS

| | | | | |
|---|---|---|---|---|
| CN | 1833112 | A | 9/2006 | |
| CN | 2837650 | Y | 11/2006 | |
| CN | 101296766 | A | 10/2008 | |
| CN | 102472316 | A | 5/2012 | |
| CN | 106623836 | A | 5/2017 | |
| DE | 19613032 | C1 | 6/1997 | |
| DE | 10327722 | B3 | 10/2004 | |
| DE | 202005001061 | U1 | 3/2005 | |
| EP | 1485218 | B1 | 5/2006 | |
| JP | S5950961 | A | 3/1984 | |
| JP | H09168816 | A | 6/1997 | |
| RU | 2274512 | C1 | 4/2006 | |
| WO | WO 97/35139 | A1 * | 9/1997 | ......... B22D 11/1287 |
| WO | 2004091830 | A1 | 3/2004 | |
| WO | 2007048834 | A1 | 5/2007 | |
| WO | 2011117383 | A1 | 5/2007 | |

* cited by examiner

DEVICE FOR COUPLING A COOLANT SUPPLY TO A ROLL

CROSS REFERENCE TO RELATED APPLICATIONS

This application is a national phase of PCT application No. PCT/EP2018/078120, filed Oct. 15, 2018, which claims priority to DE patent application No. 102017218629.1, filed Oct. 18, 2017, and DE patent application No. 102018206688.4, filed Apr. 30, 2018 all of which are incorporated herein by reference thereto.

TECHNICAL FIELD

The invention relates to a device for coupling a coolant supply and/or coolant drainage to a roller and/or roll, especially for use in the metal foundry industry, such as a continuous casting installation.

PRIOR ART

In a continuous casting installation, the molten metal being cast is at first brought into contact with a mold. The mold may be designed as a funnel mold, and it places the molten metal in the desired shape of a strand. The not yet fully hardened strand exits vertically downward from the mold and is then transported along a strand guide, as it gradually cools down. If the strand guide has a bend area, in which the strand is deflected downward from the vertical direction to the horizontal direction, the continuous casting installation is known as a "vertical bending system". The transporting of the strand takes place across rolls, which are arranged in pairs and form a gap passage, through which the strand goes. The strand guide is followed usually by a straightening driver, having multiple driven rollers and being adapted to pull the strand actively from the strand guide. The straightening driver may be seen as part of a connection system located between the strand guide and a roll train for the rolling of the cast strand.

During the transporting and processing of the strand, the strand comes into contact with rollers and rolls, which on account of the high strand temperature are at least partly cooled by having a coolant, such as water, flow through the cooling rollers or rolls. For this purpose, a coolant supply and possibly a coolant drainage must be connected in reliable manner to the roller or roll being cooled down, so that a circulation of the coolant can be realized through a bore running in the roll or roller journal.

EP 1 613 441 B1 describes a device for coupling a coolant supply to a roll. The technical solution presented therein makes use of a flange, which is installed in the roll journal. The flange serves for holding an elastic sleeve. The flange and the elastic sleeve are part of a sealing unit, i.e., that unit which acts as a means of sealing off a section of the coolant supply situated at the roll side against the roll bore through which the coolant flows. The design requires a roll journal enabling a sideways bearing and fixation of the flange, so that the diameter of the roll journal cannot be less than a minimum dictated by the flange.

PRESENTATION OF THE INVENTION

Since the invention presented in the following can be used for rollers and rolls of various kind, the term "roll" shall be used from now on as a term subsuming the rollers and rolls of every kind that are used for the transporting and the processing of a continuous or striplike metal product, such as transport rollers, straightening driving rollers, working rolls, back-up rolls, intermediate rolls, and so forth.

One problem which the invention proposes to solve is to provide a device for coupling a coolant supply and/or coolant drainage on a roll, having good reliability and maintainability with a compact design.

The problem is solved with a device for coupling a coolant supply and/or coolant drainage to a roll, especially in a continuous casting installation, wherein the roll includes a journal, which is mounted rotatably in a bearing block, and a lateral recess, extending in the axial direction, and at least one roll cooling channel, through which a coolant can pass, wherein the device includes at least one coolant channel, which can be brought into fluidic connection with the roll cooling channel on the journal side; and a sealing unit for sealing the fluidic connection between the coolant channel and the roll cooling channel, comprising an inner module and an outer module; wherein the inner module comprises a hollow cylindrical element, which can be inserted into the lateral recess of the journal, and which when viewed in the axial direction has no flange on the outer side of the journal. Advantageous modifications will emerge from the dependent claims, the following presentation of the invention, and the description of preferred exemplary embodiments.

The device according to the invention serves for coupling a coolant supply and/or coolant drainage to a roll. The device will find application preferably in the metal foundry industry, especially in continuous casting installations. Preferably, the device is designed to couple a coolant supply and/or coolant drainage to a transport roller, straightening driving roller, working roll, back-up roll, or intermediate roll.

The roll comprises a journal, which is rotatably mounted in a bearing block, which can be designed as a stationary frame or rack. The supporting occurs preferably by means of one or more roller bearings, which are fastened to the bearing block. Moreover, the journal comprises a lateral recess extending in the axial direction, being preferably a bore extending in the axial direction and situated centrally on the axis of the roll and the journal, so that the journal and the recess run coaxially. The roll furthermore comprises at least one roll cooling channel, through which a coolant can flow, in order to cool the roll from the inside during its operation. Preferably, the roll cooling channel (or multiple roll cooling channels) is designed so that the coolant can circulate inside the roll when the device is coupled to it.

The device according to the invention for coupling a coolant supply and/or coolant drainage to the roll comprises at least one coolant channel, which can be brought into fluidic connection with the roll cooling channel on the journal side. This connection is preferably releasable, in order to make possible a replacing of the components and to simplify the maintenance. The device moreover comprises a sealing unit for sealing the fluidic connection between the coolant channel and the roll cooling channel. The sealing unit serves to prevent the cooling fluid from leaking, despite the components moving relative to each other. For this purpose, the sealing unit comprises an inner module and an outer module. The inner module comprises a hollow cylindrical element, which can be inserted into the lateral recess, so that it turns together with the roll. In the mounted condition, the hollow cylindrical element is installed in the lateral recess such that it turns together with the roll. Preferably, the hollow cylindrical element can be or is secured in the lateral recess of the journal by force locking and/or form fit. The hollow cylindrical element has no flange on the outer side of the journal, looking the axial direction, i.e., at the back end in the direction of inserting. In other words: the outer diameter of the hollow cylindrical element does not extend beyond the diameter of the lateral recess. Preferably, the hollow cylindrical element has a constant outer diameter along its axial extension, corresponding to that of the lateral recess.

The sealing unit and thus the entire device can have an especially compact design, thanks to the flangeless hollow cylindrical element. In particular, the sealing unit can be used suitably for journals of especially small diameter. The maintainability of the sealing unit is not affected by this.

For the fastening of the hollow cylindrical element, moreover the inner module preferably comprises a securing ring, which can abut against an end face of the hollow cylindrical element. Preferably this refers to the end face on the axial outer side, i.e., the back side in the inserting direction. The securing ring may be designed as an independent component, in which case it can preferably be secured in a groove which is formed in the lateral recess of the journal; but the securing ring may also be formed integrally or as a single piece with the hollow cylindrical element and/or the journal. With the aid of the securing ring, a structurally simple and reliable fixation of the hollow cylindrical element in the lateral recess of the journal can be realized. However, the fastening or fixation can also be done in a different way, as long as the hollow cylindrical element is flangeless in the above described manner.

Preferably, the hollow cylindrical element in the installed condition comprises a bottom on its inside, looking in the axial direction, i.e., the front end in the inserting direction, which at least partly closes the hollow cylindrical element. The hollow cylindrical element in this case thus has roughly the shape of a pot. However, the bottom may be pierced by one or more openings, especially so as to realize a passage for the supplying of the roll cooling channel. Preferably, the bottom has an axial bore, which stands in fluidic connection with an axial roll bore, which is part of one embodiment of the roll cooling channel. Alternatively or additionally, the axial bore of the bottom may receive a tube, which extends into the roll and is part of one embodiment of the roll cooling channel.

Preferably, the inner module comprises at least one pin, by which the hollow cylindrical element can be secured to the journal, the pin being introduced into a pin opening of the hollow cylindrical element and a corresponding pin opening of the journal which is aligned with it. With the aid of the pin, and possibly in addition to the above described securing ring, a structurally simple and reliable fixation of the hollow cylindrical element in the lateral recess of the journal can be realized. However, the fastening or fixation can also be done in a different way, as long as the hollow cylindrical element is flangeless in the above described manner. Preferably, the pin opening of the hollow cylindrical element is formed in the bottom.

Preferably, the inner module comprises a securing cover, which in the mounted condition abuts against an end face of the hollow cylindrical element and is fastened to the journal, for example, being screwed to the journal by means of one or more screws. According to an especially preferred embodiment, the securing cover secures the hollow cylindrical element with form fit in the lateral recess of the journal. The form fit may be between the hollow cylindrical element and the lateral recess of the journal and/or between the hollow cylindrical element and the securing cover. This prevents a twisting of the hollow cylindrical element in the lateral recess of the journal, thereby preventing an excessive strain on sealing means, such as O-rings, in the hollow cylindrical element. The danger of any leakage of the rotary union is reduced.

Preferably, the outer module comprises an elastic sleeve, which is or can be installed in the hollow cylindrical element. The elastic sleeve is part of the sealing unit and is made for example of stainless steel, but it may also be produced from another material or a combination of different materials and/or parts (such as a plastic or rubber), as long as it is assured that its shape and elasticity ensure a reliable sealing.

Preferably, the inner module comprises a slide ring, preferably firmly connected to the hollow cylindrical element, and the outer module likewise comprises a slide ring, preferably firmly connected to the elastic sleeve, which stand in frictional contact with each other to seal off the fluidic connection. In this way, the rotatability of the roll relative to the outer module is made possible and at the same time a good seal is assured, to prevent leakage of the cooling fluid at the fluid intake. Preferably, the sealing surfaces of the two slide rings are situated perpendicular to the axis of rotation of the roll. This geometrical arrangement of the sealing surfaces is preferable in order to cushion the forces acting on the slide rings in a technically simple manner; however, the sealing unit may also have a different design in this regard, as long as a leakage of the cooling fluid at the respectively moving parts is prevented.

Preferably, the two slide rings are arranged inside the hollow cylindrical element, so that the sealing unit can have an especially compact design. Preferably, the slide rings are provided on the bottom side of the hollow cylindrical element, and in this case the slide ring of the inner module is installed at least partly in a recess of the bottom of the hollow cylindrical element and can thus be secured to the hollow cylindrical element. In this way, the bottom is utilized synergistically for the securing of the slide ring of the inner module by force locking and/or form fit.

Preferably, the outer module comprises an insert piece, which can be mounted releasably on the bearing block and comprises at least a first channel, which in the mounted condition of the insert piece brings the coolant channel into fluidic connection with the roll cooling channel. The insert piece ensures that an access to the sealing unit is possible from the outside, for example to perform maintenance work or to replace components, without requiring an extensive disassembly of the bearing block or any other housing. Thus, for example, it is easily possible to supply a flushing agent, such as pressurized air, in order to blow out the cooling fluid and/or contaminants from the interior of the roll and thus facilitate the maintenance work. When the insert piece is mounted in place, both the components of the coolant supply and the coolant drainage as well as the sealing unit are protected against external influences, especially in the harsh environment of a continuous casting installation, so that excessive wear and tear is prevented.

Preferably, the roll has an axially extending roll bore, in which a tube is installed, so that inside the tube there is formed a first roll cooling channel and in a gap between the tube and the roll bore (more precisely: the wall of the roll bore) or a second coaxially extending tube there is formed a second roll cooling channel. The tube and the roll bore or the second tube preferably extend parallel and concentrically. Preferably, now, the device comprises at least two coolant channels, which can be brought into fluidic connection respectively with the first roll cooling channel and the second roll cooling channel. In this way, a coolant circulation is realized in compact manner with inlet and outlet on one side of the roll. Preferably, moreover, the insert piece has a second channel, and in the mounted condition of the insert piece the first channel and the second channel stand in fluidic connection respectively with the first roll cooling channel and the second roll cooling channel, and respectively with one of the coolant channels on the other side.

Preferably, the hollow cylindrical element in the installed condition does not protrude beyond the journal, looking in the axial direction, thereby achieving an especially compact realization of the sealing unit and thus of the device as a whole.

The above presented device for coupling a coolant supply and/or coolant drainage to a roll is especially suited for use in the metal foundry industry, such as a continuous casting installation. However, the invention can also be used in other sectors. In this regard, one may mention rolling and/or winding applications in the metal processing industry in general or in paper making machines or textile machines.

Further benefits and features of the present invention can be seen from the following description of preferred exemplary embodiments. The features described there may be realized standing alone or in combination with one or more of the above presented features, as long as the features do not contradict each other. The following description of the preferred exemplary embodiments is given with reference to the enclosed drawing.

DETAILED DESCRIPTION OF PREFERRED EXEMPLARY EMBODIMENTS

In the following, preferred exemplary embodiments shall be described with the aid of the figures. The same, similar, or equivalent elements shall be given the same reference numbers. Moreover, a repeat description of these elements will sometimes be foregone in order to avoid redundancy.

Figure 1:
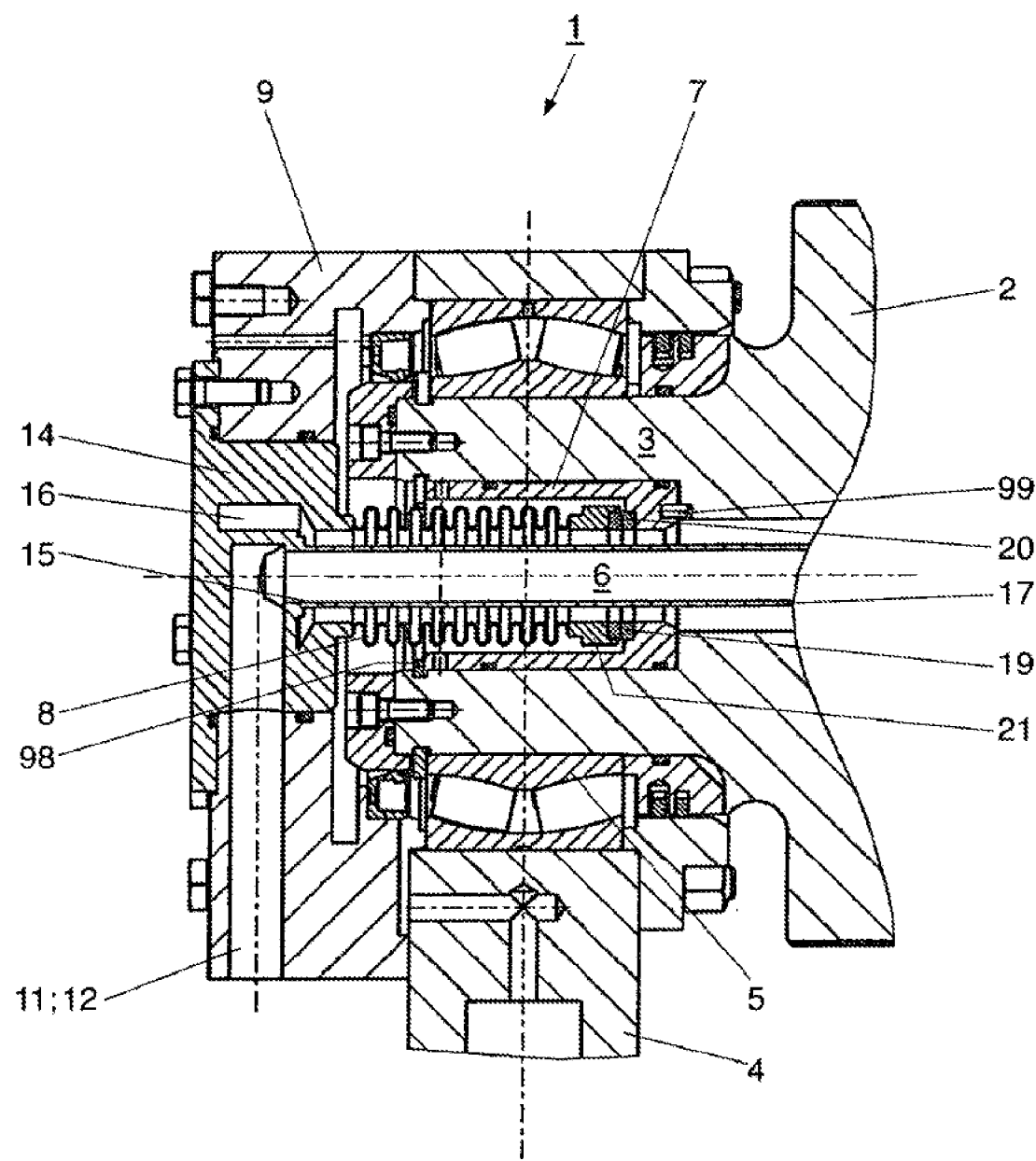
FIG. 1 shows a longitudinal section through a device for coupling a coolant supply and coolant drainage to a roll according to one exemplary embodiment.

FIG. 1 shows a device 1 according to a first exemplary embodiment, for coupling a coolant supply to a roll 2, which can be a transport roller, working roll, back-up roll, and so forth, in a continuous casting installation. The roll 2 comprises a journal 3, which is rotatably mounted in one or more roller bearings 5. The roller bearing 5 is secured to a bearing block 4, such as a stationary frame or rack.

The roll 2 comprises an axially extending roll bore 6, which functions as a cooling channel, through which the roll 2 is supplied with a coolant, preferably water. The cooling channel in the present exemplary embodiment extends centrally along the axis of the roll 2, but the roll 2 can also receive a flow of coolant in another manner (such as through one or more cooling channels passing through the body of the roll 2 in another location), as long as a reliable supply of coolant from a coolant supply is assured.

In a lateral recess or bore of the journal 3 there is installed a hollow cylindrical element 7, serving to hold an elastic sleeve 8. The hollow cylindrical element 7 has roughly the shape of a pot, apart from the fact that the bottom of the pot is pierced by a tube 17, running in the roll bore 6. The hollow cylindrical element 7 is installed such that the bottom lies further inside the roll 2, looking in the axial direction, than the fully open end of the hollow cylindrical element 7. The hollow cylindrical element 7 has no flange lying against the end face of the journal 3 on the outside. The hollow cylindrical element 7 in the present exemplary embodiment furthermore does not extend beyond the end of the journal 3, looking in the axial direction.

The elastic sleeve 8 is made of stainless steel, for example, but it may also be made of another material or a combination of different materials and/or parts (such as a plastic or rubber), as long as it is assured that its shape and elasticity assure a reliable sealing. The elastic sleeve 8 in the exemplary embodiment shown is installed releasably in the hollow cylindrical element 7, in particular replaceably.

The axial end face of the journal 3 is covered according to the exemplary embodiment by a bearing block cover 9. The bearing block cover 9 comprises a first coolant channel 11 and possibly a second coolant channel 12 (for a supply and drainage of the coolant on the same side of the roll 2). The coolant channels 11, 12 may be seen as part of the coolant supply or as being connected to such. The coolant channel 11 stands in fluidic connection with a coolant channel inside the roll 2, so that it can be supplied with coolant through the coolant channel 11.

In the present exemplary embodiment, for this purpose an insert piece 14 is installed in an opening of the bearing block cover 9 having a first channel 15 extending therein, which stands in fluidic connection with the coolant channel 11 in the mounted state of the insert piece 14. The first channel 15 pointing into the interior of the roll protrudes into an annular gap or passes into such, which is formed by two coaxially extending tubes, the inner tube being the aforementioned tube 17. The coolant is transported through the annular gap into the interior of the roll 2. The annular gap is dimensioned such that, on the one hand, a relative rotatability of the tube is assured, and at the same time an adequate flow of the coolant is made possible. The back transport of the coolant occurs through the interior of the tube 17.

The insert piece 14 can moreover comprise a second channel 16, which—if present—stands in fluidic connection with the coolant channel 12. In the exemplary embodiment shown in FIG. 1, the transport of coolant away from the tube 17 occurs through the second channel 16, thereby realizing a coolant circulation with an inlet and an outlet on one side of the roll 2. The channels inside the roll 2 and the journal 3 through which the coolant can flow are also known as roll cooling channels. The inflow and outflow of the coolant inside the roll 2 is preferably organized such that the fresh coolant flows into the roll 2 through the above described annular gap and flows out through the interior of the tube 17. For this purpose, the coolant channel empties inside the tube 17 through the second channel 16 into the coolant channel 12. However, there is no restraint in this regard, as long as the roll cooling channels and the connections to the coolant channels 11, 12 are realized such that a reliable coolant circulation is assured. It should be pointed out in this regard that only one coolant channel 11 is shown in the cross section of FIG. 1, while the other coolant channel 12 runs outside the sectional view. The two coolant channels 11 and 12 preferably form a V shape in the cross section, perpendicular to the axis of rotation of the roll 2, converging with each other toward the tube 17 and standing there in fluidic connection with the corresponding roll cooling channels via the two channels 15 and 16.

For the secure fluidic connection between the fluid supply and the roll 2, a sealing unit is provided. The sealing unit comprises an outer and an inner module.

The inner module comprises the hollow cylindrical element 7 and, in the present first exemplary embodiment, a slide ring 20. The hollow cylindrical element 7 and the slide ring 20 may be firmly joined together, which also includes an integral and/or one-piece connection. Preferably, the slide ring 20 is at least partly inserted into a recess in the bottom of the hollow cylindrical element 7, thereby assuring a simple and secure fixation of the slide ring 20 on the hollow cylindrical element 7. In this way, a form-fitting and/or force-locking connection is produced between the slide ring 20 and the hollow cylindrical element 7.

The outer module comprises the elastic sleeve 8 as well as the insert piece 14. Moreover, the outer module of the sealing unit comprises a slide ring 19, which stands in frictional contact with the slide ring 20, in order to enable a turning of the roll 2 relative to the outer module and at the same time assure a tight seal, thereby preventing a leakage of the cooling fluid. According to the present exemplary embodiment, the sealing surfaces of the two slide rings 19 and 20 are situated perpendicular to the axis of rotation of the roll 2. This geometrical arrangement of the sealing surfaces is preferable for a technically simple and secure cushioning of the forces acting on the slide rings 19 and 20; however, the sealing unit may also have a different construction in this regard, as long as a leakage of the cooling fluid at the parts moving relative to each other is prevented. In the present exemplary embodiment, the outer module of the sealing unit moreover comprises an extension 21, serving for stabilization and fastening of the slide ring 19 on the sleeve 8. The extension 21 may also be omitted. One, several, or all of the components of the outer module may be firmly joined together, also including an integral and/or one-piece design.

In the present exemplary embodiment, the slide rings 19, 20 are located at the bottom end of the hollow cylindrical element 7 (looking in the axial direction), which can save design space on the part of the insert piece 14, contributing overall to a more compact structural design of the device. However, the slide rings 19, 20 may also be positioned in another location.

According to the present exemplary embodiment, the hollow cylindrical element 7 is secured on the part of the insert piece 14 by means of a securing ring 98, which abuts against the end face of the hollow cylindrical element 7 and is secured in a groove formed in the lateral recess of the journal 3. The securing ring 98 and the hollow cylindrical element may alternatively be formed integrally or as a single piece. Moreover, the securing ring may also be fashioned as a single-piece or integral part of the journal 3. The opposite bottom end of the hollow cylindrical element is secured on the journal 3, for example by means of one or more pins 99. For this purpose, the pin 99 (or several pins) is introduced into an opening at the bottom of the hollow cylindrical element 7 and a corresponding opening of the journal 3, aligned with it. The securing ring 98 and the pin 99 are associated with the inner module.

The exemplary embodiment depicted and its described modifications enable a structurally simple and reliable fixation of the hollow cylindrical element in the lateral recess of the journal 3. However, the fastening or fixation may also be done otherwise, as long as a flange can be eliminated on the part of the insert piece 14.

The insert piece 14 assures an access from the outside to the sealing unit, for example in order to perform maintenance work or to replace components, without requiring a removal of the entire bearing block cover 9. This allows one to supply a flushing agent, such as compressed air, in order to blow out the cooling fluid or contaminants from the interior of the roll and thus facilitate the maintenance work. Moreover, the sealing unit and thus the overall device can have a particularly compact design on account of the flangeless hollow cylindrical element 7. In particular, the sealing unit can be used for journals 3 of especially small diameter.

The fastening of the bearing block cover 9 to the bearing block 4 is preferably releasable, such as by using fastening screws. Likewise, the insert piece 14 is preferably releasably fastened to the bearing block cover 9 by fastening screws. Hence, an access from the outside is easily possible. When the insert piece 14 is mounted in the bearing block cover 9, both the components of the coolant supply and coolant drainage and the sealing unit are protected against external factors, especially in the harsh environment of a continuous casting installation, thereby preventing excessive wear and tear.

Figure 2:
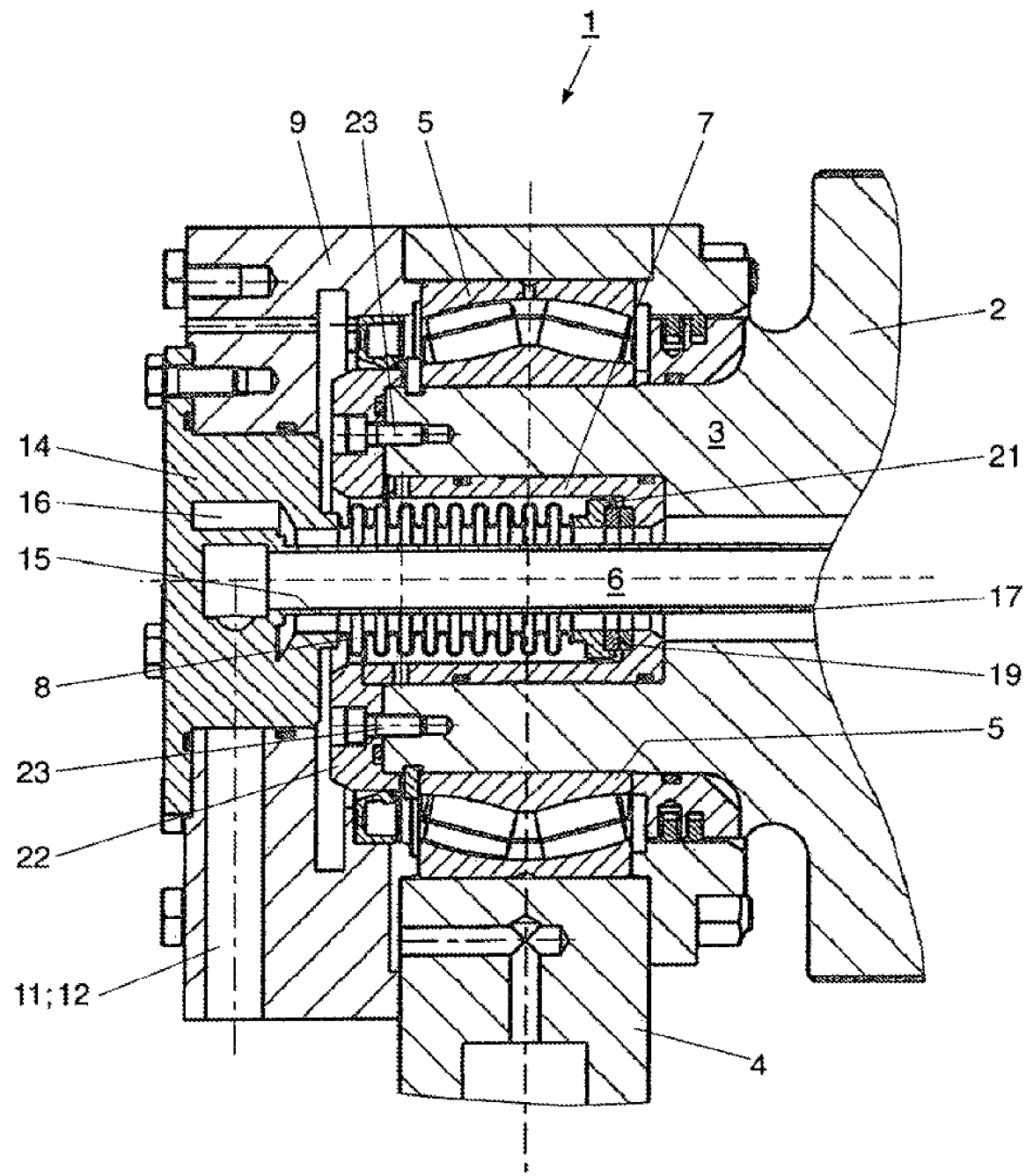
FIG. 2 shows a longitudinal section through a device for coupling a coolant supply and coolant drainage to a roll according to another exemplary embodiment.

FIG. 2 shows a device 1 for the coupling of a coolant supply and coolant drainage to a roll 2 according to a second exemplary embodiment.

The exemplary embodiment of FIG. 2 shows an alternative design for the securing and fixation of the hollow cylindrical element 7. According to this design, the securing ring 98 and/or the pins 99 of the first exemplary embodiment can be omitted. Those components not involving the fastening and fixation of the hollow cylindrical element 7 correspond to those of the first exemplary embodiment.

The hollow cylindrical element 7 is also preferably flangeless according to the second exemplary embodiment. This is now secured with form fitting by means of a securing cover 22. The securing cover 22 is a disk-shaped element, which abuts against the end face of the hollow cylindrical element 7 and is somewhat compressed, so that the hollow cylindrical element 7 is held with form fitting in the lateral recess of the journal 3. For this purpose, the securing cover can be fastened by means of screws 23 to the journal 3. In order to prevent a twisting of the hollow cylindrical element 7 in the lateral recess of the journal 3 even more reliably, means can be provided in the lateral recess of the journal 3 and/or on the outside of the hollow cylindrical element 7 and/or on the securing cover 22 to assist in a form fitted support. The form fit may thus be present between the hollow cylindrical element 7 and the lateral recess of the journal 3 and/or between the hollow cylindrical element 7 and the securing cover 22. Thus, for example, grooves may be provided in the lateral recess of the journal 3, engaging with tongues on the outer circumference of the hollow cylindrical element 7, or the lateral recess of the journal 3 and the hollow cylindrical element 7 are not circular cylindrical, but instead have mutually matching shapes (such as polygonal cross sections) preventing a twisting. Alternatively or additionally, a form fit exists between the hollow cylindrical element 7 and the securing cover 22, such as by a kind of tongue and groove design.

The use of the securing cover 22 can simplify the mounting of the device 1. Furthermore, one special technical effect of the second exemplary embodiment is that a prevention of twisting of the hollow cylindrical element 7 can also be achieved if, for example, the pin 99 (or several pins 99) is forgotten when mounting the device 1. A protection against twisting of the hollow cylindrical element 7 is therefore important, since a turning of the hollow cylindrical element 7 relative to the journal 3 may result in great strain on the sealing means, such as O-rings in the hollow cylindrical element 7. This increases the risk of leakage of the rotary union.

All individual features presented in the exemplary embodiments can be combined with each other and/or exchanged for each other, as long as this is feasible, without leaving the scope of the invention.

LIST OF REFERENCE NUMBERS

1 Device for coupling a coolant supply
2 Roll
3 Journal
4 Bearing block
5 Roller bearing
6 Roll bore
7 Hollow cylindrical element
8 Elastic sleeve
9 Bearing block cover
11 Coolant channel
12 Coolant channel
14 Insert piece
15 First channel
16 Second channel
17 Tube
19 Slide ring
20 Slide ring
21 Extension
22 Securing cover
23 Screw
98 Securing ring
99 Pin

The invention claimed is:

1. A device (1) for coupling a coolant supply and/or coolant drainage to a roll (2), wherein the roll (2) comprises a journal (3), which is mounted rotatably in a bearing block (4), and a lateral recess, extending in an axial direction, and at least one roll cooling channel for conducting a coolant, said device (1) comprising:
at least one coolant channel (11, 12), connectable with the at least one roll cooling channel on a journal (3) side to form a fluidic connection between the at least one coolant channel and the at least one roll cooling channel; and
a sealing unit for sealing the fluidic connection between the at least one coolant channel and the at least one roll cooling channel, said sealing unit comprising an inner module and an outer module;
said inner module comprising a hollow cylindrical element (7) insertable into the lateral recess of the journal (3), said hollow cylindrical element having a first end facing the outer module and a second end facing the roll, said first and second ends having a respective opening, with the opening of the first end having a diameter greater than a diameter of the second end,
said hollow cylindrical element (7) having no flange on an outer side of the journal, looking in the axial direction.

2. The device according to claim 1, characterized in that the inner module comprises a securing cover (22), which in a mounted condition abuts against an end face of the hollow cylindrical element (7) and is fastened to the journal (3).

3. The device according to claim 2, characterized in that the securing cover (22) secures the hollow cylindrical element (7) with form fit in the lateral recess of the journal (3).

4. The device according to claim 2, wherein the cover is screwed to the journal by means of one or more screws.

5. The device according to claim 1, characterized in that the inner module further comprises a securing ring (98), abutting an end face of the hollow cylindrical element (7).

6. The device according to claim 5, wherein the securing ring is securable in a groove formed in the lateral recess of the journal.

7. The device according to claim 1, characterized in that the hollow cylindrical element (7) in an installed condition comprises a bottom on the second end, looking in the axial direction, with the opening of the second end provided in the bottom.

8. The device according to claim 1, characterized in that the inner module comprises at least one pin (99), for securement of the hollow cylindrical element to the journal (3), the at least one pin (99) being introduced into a pin opening of the hollow cylindrical element (7) and a corresponding pin opening of the journal (3) which is aligned with it.

9. The device according to claim 8, characterized in that the pin opening of the hollow cylindrical element (7) is formed in the bottom.

10. The device according to claim 1, characterized in that the outer module comprises an elastic sleeve (8), installable in the hollow cylindrical element (7).

11. The device according to claim 10, characterized in that the inner module comprises a first slide ring (20), and the outer module comprises a second slide ring (19) in frictional contact with the first slide ring to seal off the fluidic connection.

12. The device according to claim 11, characterized in that the first and second slide rings (19, 20) are arranged inside the hollow cylindrical element.

13. The device according to claim 11, characterized in that the first and second slide rings (19, 20) are provided on the end of the cylindrical element opposite the open end.

14. The device according to claim 11, wherein the first slide ring is firmly connected to the hollow cylindrical element, and the second slide ring is firmly connected to the elastic sleeve.

15. The device according to claim 1, characterized in that the outer module comprises an insert piece (14), which is releasably mountable on the bearing block (4) and which comprises a first channel (15), which in a mounted condition of the insert piece (14) brings the at least one coolant channel (11) into fluidic connection with the at least one roll cooling channel.

16. The device according to claim 15, characterized in that the insert piece (14) further comprises a second channel (16), wherein, in a mounted condition of the insert piece (14), the first channel (15) and the second channel (16) stand in fluidic connection respectively with the first roll cooling channel and the second roll cooling channel.

17. The device according to claim 1, characterized in that the roll has an axially extending roll bore (6), in which a tube (17) is installed, so that inside the tube a first roll cooling channel is formed, and in a gap between the tube (17) and the roll bore (6) or a second coaxially extending tube a second roll cooling channel is formed, wherein the device comprises at least two coolant channels (11, 12), which are respectively connectable with the first roll cooling channel and the second roll cooling channel to form a fluidic connection respectively with the first roll cooling channel and the second roll cooling channel.

18. The device according to claim 1, characterized in that the hollow cylindrical element (7), in an installed condition, does not protrude beyond the journal (3), looking in the axial direction.

19. The device according to claim 1, for use in a continuous casting installation.

20. The device according to claim 1, wherein the first slide ring of the inner module is installed at least partly in a recess of the bottom of the hollow cylindrical element and is thus secured to the hollow cylindrical element.

\* \* \* \* \*